US009219938B2

(12) United States Patent
Snow (10) Patent No.: US 9,219,938 B2
(45) Date of Patent: Dec. 22, 2015

(54) SYSTEM AND METHOD FOR ROUTING DIGITAL AUDIO DATA USING HIGHLY STABLE CLOCKS

(71) Applicant: Wheatstone Corporation, New Bern, NC (US)

(72) Inventor: Gary C. Snow, New Bern, NC (US)

(73) Assignee: Wheatstone Corporation, New Bern, NC (US)

(*) Notice: Subject to any disclaimer, the term of this patent is extended or adjusted under 35 U.S.C. 154(b) by 448 days.

(21) Appl. No.: 13/666,477

(22) Filed: Nov. 1, 2012

(65) Prior Publication Data
US 2014/0121795 A1 May 1, 2014

(51) Int. Cl.
G06F 17/00 (2006.01)
H04N 21/43 (2011.01)
H04N 21/242 (2011.01)

(52) U.S. Cl.
CPC ......... *H04N 21/4305* (2013.01); *H04N 21/242* (2013.01)

(58) Field of Classification Search
CPC .................... H04N 21/242; H04N 21/4305
USPC .......................................................... 700/94
See application file for complete search history.

(56) References Cited

U.S. PATENT DOCUMENTS

| 4,675,863 A * | 6/1987 | Paneth et al. ................. 370/334 |
| 5,245,636 A | 9/1993 | Sari et al. |
| 5,271,043 A | 12/1993 | Fouche et al. |
| 6,272,132 B1 * | 8/2001 | Ofek et al. .................... 370/389 |
| 6,360,271 B1 | 3/2002 | Schuster et al. |
| 6,512,761 B1 | 1/2003 | Schuster et al. |
| 7,015,848 B2 | 3/2006 | Ohashi et al. |
| 7,649,910 B1 * | 1/2010 | Wechsler et al. ............. 370/503 |
| 7,710,941 B2 | 5/2010 | Rietschel et al. |
| 7,949,032 B1 * | 5/2011 | Frost ............................. 375/140 |
| 8,321,593 B2 * | 11/2012 | Bushell et al. ................ 709/248 |
| 2003/0174700 A1 * | 9/2003 | Ofek et al. .................... 370/389 |
| 2004/0103444 A1 | 5/2004 | Weinberg et al. |
| 2007/0116061 A1 * | 5/2007 | Meagher et al. ............. 370/503 |
| 2010/0118895 A1 * | 5/2010 | Radulescu .................... 370/503 |
| 2010/0321117 A1 * | 12/2010 | Gan ................................. 331/3 |

(Continued)

FOREIGN PATENT DOCUMENTS

| JP | 2000065923 | 3/2000 |
| JP | 2003242727 | 8/2003 |
| JP | 2003316468 | 11/2003 |
| JP | 2004246952 | 9/2004 |

OTHER PUBLICATIONS

Sonet Wikipedia page available at least 2011.*

(Continued)

*Primary Examiner* — Paul McCord
(74) *Attorney, Agent, or Firm* — Robert Curcio; DeLio, Peterson & Curcio, LLC (57) ABSTRACT

A system and method for routing digital audio data synchronized where the source and destination units are synchronized to individual, local chip-scale atomic clocks. A source unit receives audio data and digitizes the data in synchronization to a local atomic clock. The data is transmitted via a communications network to at least one destination unit that receives the network transmitted data, decodes and reconstructs the data in synchronization with its own local atomic clock, and outputs the data to an audio destination.

16 Claims, 4 Drawing Sheets

(56) References Cited

U.S. PATENT DOCUMENTS

| | | |
|---|---|---|
| 2011/0110360 A1 | 5/2011 | Fenwick et al. |
| 2011/0274192 A1 | 11/2011 | Wei et al. |
| 2011/0299641 A1 | 12/2011 | Barkan |
| 2012/0155476 A1* | 6/2012 | Pavani et al. .................. 370/400 |

OTHER PUBLICATIONS

Medialinks sonet audio codec available at least 2011.*
G.783 specification; c2006.*
G.823 specification; c2000.*
AES3 Wikipedia p. c2012.*

\* cited by examiner

SYSTEM AND METHOD FOR ROUTING DIGITAL AUDIO DATA USING HIGHLY STABLE CLOCKS

BACKGROUND OF THE INVENTION

1. Field of the Invention

This invention relates to audio routing systems and networks, and in particular to a system and method for transferring data over audio and video networks real-time using highly accurate and stable clocks to control the transfer, digitization, and playback processes.

2. Description of Related Art

Many systems are available to provide high quality digital and audio data transfer from one device to another over a digital network. Transferring audio data in real-time requires that the source and destination generate and consume the data at identical rates in order to avoid accumulating data or running out of data at the destination. This requires some form of clock synchronization.

Clock synchronization deals with understanding the temporal ordering of events produced by concurrent processes. It is useful for synchronizing senders and receivers of messages, controlling joint activity, and the serializing concurrent access to shared objects. The goal is that multiple unrelated processes running on different machines should be in agreement with and be able to make consistent decisions about the ordering of events in a system. One aspect of clock synchronization deals with synchronizing time-of-day clocks among groups of machines. In this case, the goal is to ensure that all machines can report the same time, regardless of how imprecise their clocks may be or what the network latencies are between the machines.

Most computers today keep track of the passage of time with a battery-backed up CMOS clock circuit, driven by a quartz resonator. This allows the timekeeping to take place even if the machine is powered off. When on, an operating system will generally program a timer circuit (for example, a Programmable Interval Timer, or PIT, in older Intel architectures and Advanced Programmable Interrupt Controller, or APIC, in newer systems) to generate an interrupt periodically (common times are 60 or 100 times per second). The interrupt service procedure simply adds one to a counter in memory. While the best quartz resonators can achieve an accuracy of one second in 10 years, they are sensitive to changes in temperature and acceleration and their resonating frequency may change as they age. The problem with maintaining a concept of time occurs when multiple entities expect each other to have the same idea of what the time is. Two watches hardly ever agree. Computers have the same problem: a quartz crystal on one computer will oscillate at a slightly different frequency than on another computer, causing the clocks to "tick" at different rates.

In systems where the devices are located nearby each other, typically a few meters, sharing a common timing signal is generally the easiest and most accurate method of synchronization. To accurately use a common timing signal, a device must be calibrated to account for the signal propagation delay from the timing source to the device. Sharing a common timing signal becomes unfeasible when the distance between devices increase or devices frequently change location. Even at moderate distances, e.g., 50 meters, a common timing signal may require significant costs for cabling and configuration. Additionally, even the smallest errors in keeping time can significantly add up over a long period. If a clock is off by just 10 parts per million, it will gain or lose almost a second a day. Thus, transmission distances will add complexity and error to the system. In general, the larger the number of hops between a computer and the original time source, the larger the error in synchronization will be.

Distributed clock synchronization attempts to mitigate the deficiencies of common timing signal synchronization. Using this approach, devices act on timing signals originating from a local clock which is synchronized to the other clocks in the system. Examples of distributed clock synchronization include devices synchronized to a GPS satellite, a PC's internal clock synchronized to an NTP time server, or a group of devices participating in the IEEE 1588 protocol. Instead of sharing timing signals directly, these devices periodically exchange information and adjust their local timing sources to match each other. GPS satellites (and now other global navigation systems) generally include three or four atomic clocks far from the source and destination locations that are monitored and controlled to be highly synchronized and traceable to national and international standards. Thus, for time synchronization, the GPS signal is received, processed by a local master clock, time server, or primary reference, and passed on to "slaves" and other devices, systems, or networks so their "local clocks" are likewise synchronized. When time information is passed on to "slaves" it is referred to as time stamping and each time pack of data is referred to as a timestamp.

Many digital audio systems are built on proprietary networks which provide clock signals along with the data which allows the destination device to slave its clock to the source device. Some open protocols, such as the Audio Engineering Society and the European Broadcast Union protocol (AES/EBU), also allow this type of synchronization by delivering the clock in the same stream as the data (self-clocking data streams).

Placing timestamps on transmitted frames can preserve packet timing relationships between the source device (transmitter) and the sink device (receiver), and thereby minimize the effects of latency and jitter over the wireless network. Latency is synonymous with delay and refers to the amount of time it takes a bit to be transmitted from source to destination. Jitter is delay that varies over time. One way to view latency is how long a system holds on to a packet. Delays are caused by distance, errors and error recovery, congestion, the processing capabilities of systems involved in the transmission, and other factors. Even if hardware-type delays are removed, the system would still have the speed-of-light delay. It takes nearly 30 ms to send a bit through a cross-country fiber-optic cable, a delay that cannot be eliminated. Delays of distance (called propagation delays) are especially critical when transmitting data to other countries (especially when considering all the equipment along the way that adds delay). Delay is also significant with satellite transmissions.

When a frame is received at the receiver, the receiver can retrieve a timestamp from the frame and release the frame to the application once the local clock reading reaches the value in the timestamp. Digital or analog audio video streams or video files usually contain some sort of explicit AV-sync timing, either in the form of interleaved video and audio data or by explicit relative time stamping of data. The processing of data must respect the relative data timing, for example, by stretching between, or interpolation of, received data. If the processing does not respect the AV-sync error, it will increase whenever data gets lost because of transmission errors or because of missing or mis-timed processing.

Advantages of timestamp-based syncing include ease in implementation, and using a single property for syncing. Disadvantages of timestamp-based syncing are based on the fact that time is a relative concept to the observer, and different machine clocks can be out of sync. Generally, in the prior art, some methods were employed to solve this: a) generate a timestamp on a single machine, which does not scale well and represents a single point of failure; or b) use logical clocks such as vector clocks. The latter being very difficult to implement. Time stamping enables correlation between multiple trace streams, and is provided by timestamp packets.

Timestamp based syncing works for client-to-master syncing but does not work as well for peer-to-peer syncing or where syncing can occur with two masters. This method is vulnerable to a single point of failure, based on whatever generates the timestamp. Furthermore, in timestamp-based syncing, time is not really related to the content of what is being synced.

On systems where clock information cannot be directly transferred, the clocking information can often be inferred from the arrival time of the data but not very accurately. This is especially true for systems using Ethernet or similar data networks, where traffic from other sources can potentially interfere with accurate packet timing. Even in cases where other traffic is not a problem, there is usually enough uncertainty in the transmission and arrival time of packets to cause the derived clock on the receive side to suffer from some jitter.

The prior art has attempted to solve the time synchronization problems through the introduction of a single atomic clock, which unfortunately has led to the problems associated with a GPS time synchronization system.

For example, in U.S. Pat. No. 7,015,848 issued to Ohashi, et al., on Mar. 21, 2006, the use of an atomic clock to produce a high quality audio signal is taught. The patent indicates that audio quality is directly related to the accuracy of the clock. A single clock is used both for recording and reproduction of the audio signal and refers to the possibility of a transmission channel between the two and the improvement obtained by using an accurate clock to eliminate signal degradation due to timing errors and delays in the transmission channel. However, the patent does not disclose the use of multiple clocks (or more accurately, multiple highly accurate clocks, such as atomic clocks) at the transmitter and receiver that would run simultaneously to reduce buffer size, eliminate the requirements of clock resynchronization, data rate control, buffer management, or any combination thereof.

In U.S. Publication No. 2011/0299641 to Barkan, et al., on Dec. 8, 2011, titled "Synchronous Network Device," a system with multiple ports is described where each port uses time data from a "grandmaster clock." The grandmaster clock data is cleaned up by removing jitter, and voltage swings, and smoothing leading edge variations. The grandmaster clock may be an atomic clock; however, only a single atomic clock is used, and a communication channel between the grandmaster clock and each network port is required.

In U.S. Publication No. 2011/0274192 to Wei, et al., on Nov. 20, 2011, titled "Synchronization Method and Device for Real-Time Distributed System" a real-time wireless communication system is described. A single GPS derived atomic clock time signal is used for the time signal. The clock signal is used by multiple digital signal processors that use the single clock signal to decide whether to operate synchronously or asynchronously.

When a single source is sending data to multiple destinations, the destination clocks must be adjusted to speed up or slow down the rate at which they use the data. This is because the source clock cannot be adjusted to match the multiple destinations which have varying clock rates. Complex clock synchronizing systems are used in these applications to control the data rate at each of the destinations.

Similarly, where a single destination is receiving data from multiple sources, the multiple sources must be kept synchronized to prevent overflow or underflow in the destination buffer. Prior art designs for both the single destination and/or single source applications need a back channel communication system for clock resynchronization. The present invention avoids the requirement of a back channel for communicating clock synchronization data and all of the resynchronization circuitry. Further, the distortions of the audio and video signal frequencies that are caused by clock resynchronization and data rate control are entirely eliminated.

In the prior art, in order to make sure that synchronization occurs and there is never a missing delay, upon arrival the data would be temporarily stored in a buffer. Once enough data was stored, it would be used for a single source and multiple destinations. When the single source starts sending data to each destination, the buffer would hold the digital packets as it receives them—without using them—until sometime later. When the digital packets are used faster than the rate that they are sent, the buffer will run out of stored data because its clock is not synchronized with the sending clock. This is due to the fact that the data packets are being sent at the rate of the sending clock (that is, at a give speed), and the destination clock is permitting the running of data at a rate slightly faster. Thus, the destination uses the data packets faster than the buffer can fill (an under flow condition). Basically, there is not enough data in the buffer, and eventually all the data packets get used. Alternatively, if the destination is not using the data packets fast enough, the buffer will overflow, that is, there is not enough storage space, and the system must continue to put data in as long as the data is being received. If the system is not using data at exactly the same rate as the incoming data rate, the data packets build up and eventually overflow the buffer. Buffer underflow and overflow conditions are indicative of a common problem in synchronization. One structural solution is to employ very large buffers; however, that requires predetermined knowledge of the amount of usage expected in a given transmission period. Accordingly, in prior art low latency real-time designs for audio and video streaming, it is required to have some form of control of the sending data rate from the source or the rate at which data is used at the destination.

Generally, large buffers allow system clock drift while the local clock is adjusted to match the clock of the incoming data (reference) packets. In typical systems, the synchronization is achieved by having the clock control circuitry or software attempt to maintain the buffers at half-full status, so the data is normally delayed a time equivalent to half the total of the buffer depth.

The present invention provides a method and apparatus to achieve very low latency in the data stream, while avoiding the necessity of having a direct physical clock connection to synchronize the clocks in the system.

SUMMARY OF THE INVENTION

Bearing in mind the problems and deficiencies of the prior art, it is therefore an object of the present invention to provide a method and apparatus for providing high quality digital audio transfer of information which does not require the transfer of clocking information (timestamps), a self-clocking data stream, or the introduction of packet arrival timing.

It is another object of the present invention to provide a method and apparatus to eliminate buffer overflow or underflow when large real-time data transfer occurs.

Still other objects and advantages of the invention will in part be obvious and will in part be apparent from the specification.

The above and other objects, which will be apparent to those skilled in the art, are achieved in the present invention which is directed to a system for routing digital data in real time comprising: a source unit having an individual atomic clock and a data packet generator, the source unit data packet generator receiving digital or analog input and generating a digitally encoded data stream from the digital or analog input synchronized to the individual atomic clock; a network or communications system for receiving and transmitting the digitally encoded data stream from the source unit; and at least one destination unit including: a local atomic clock for each of the at least one destination unit; an elastic store buffer receiving the digitally encoded data stream from the network; a receiver for decoding or reconstructing the digitally encoded data stream, the receiver synchronized to the local atomic clock; and an output to at least one audio destination.

The digital or analog input may be signals from a microphone, personal computer, a CD player, a tape recorder, a satellite receiver, a mixer, a DVD player, or a separate router system.

The digitally encoded data stream preferably comprises audio data, video data, or a combination thereof, and does not include time stamped data.

The elastic store buffer comprises a FIFO elastic buffer having approximately two milliseconds of storage depth.

At least one audio destination may be of the form of a speaker, an amplifier, a mixer, a recorder, a personal computer, a separate router system, or any combination thereof.

The individual atomic clock of the source unit, and the local atomic clock for each of the at least one destination unit, is preferably a clock device using electronic transition frequency in microwave, optical, or ultraviolet regions as a frequency standard for a timing element.

The system may also include a plurality of source units, each having an individual atomic clock and a data packet generator, each source unit data packet generator receiving digital or analog input and generating a digitally encoded data stream from the digital or analog input synchronized to each source unit individual atomic clock.

In a second aspect, the present invention is directed to a system for routing audio digital data in real time comprising: an audio source adapted to accept at least one audio signal, the audio source including: an internal atomic clock; and an audio converter for converting the at least one audio signal into digital format forming digital data packets, the digital data packets synchronized to the atomic clock; a communications network for receiving the digital data packets from the audio source and transmitting to at least one destination unit; the at least one destination unit adapted to accept the digital data packets from the communication network, each of the at least one destination unit including: a local atomic clock; an elastic store buffer for receiving the digital data packets from the communications network; and a receiver for decoding or reconstructing the digital data packets, the receiver synchronized to the local atomic clock; and an audio destination for receiving an output from the at least one destination unit.

In a third aspect, the present invention is directed to a method for routing digital audio data comprising: receiving a digital or analog input audio signal at a source location; generating a digitally encoded data stream from the digital or analog input audio signal; synchronizing the digitally encoded data stream to an atomic clock at the source location; transmitting the synchronized digitally encoded data stream to a communications network; receiving the digitally encoded data stream at a destination location; decoding or reconstructing the digitally encoded data stream in synchronization to an atomic clock at the destination location; and transmitting the decoded or reconstructed digitally encoded data stream to an audio destination.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-4 of the drawings in which like numerals refer to like features of the invention.

The present invention involves equipment to transfer digital data, typically musical or sound of some sort, while eliminating even very slight offsets in the rate at which the digital signals are received. Preferably, each data packet is audible, and the object is to minimize the variation in that rate when sending a digital data either from one source to a plurality of receiving destinations or from a plurality of sources to be combined at a single destination, such that complete synchronization is always achieved.

A digital audio transfer apparatus is presented, which will allow for an improved method for transferring digital data in real time with low latency. In this manner, the destination begins to play immediately after the source begins to send. Importantly, independent, highly accurate clocks that exceed the accuracy of current state of the art quartz clocks are used at each end of the transfer link. These clocks are preferably chip-scale atomic clocks. That is, for multiple receivers, multiple high accuracy reference clocks are used, one for each receiver, and each high accuracy reference clock is local to its corresponding receiver. The same is true for multiple transmitters—there is one local reference clock for each transmitter.

The invention is applicable to audio, video, or other real time low latency data transfers. Due to the real time and low latency requirements, and because conventional clocks are not sufficiently accurate, prior art systems require that the source or destination be able to adjust the data rate to prevent a data buffer from overflowing or under flowing.

The method and apparatus of the present invention eliminates the need for a clock or data rate control system by using a local highly accurate reference clock, preferably an atomic clock, at both ends of the channel.

Generally, in the preferred embodiment, the apparatus of the present invention comprises a source unit with a highly stable and accurate clock source, which would presuppose a clock far more accurate than a quartz clock, and which accepts digital or analog audio input, or optionally includes a DVD or CD drive or other audio source, and generates a digitally encoded audio data stream; a network or communications system; and a destination unit, which includes a receiver for decoding the digitally encoded audio data stream, a highly stable and accurate atomic clock, a FIFO elastic store buffer, and an output to an audio destination, such as an amplifier, mixer, or recorder. The high accuracy clock may be achieved by implementing a chip-scale atomic clock in each unit.

In accordance with one aspect of the present invention, the source unit synchronizes its audio data to the highly stable and accurate reference clock source. Similarly, the destination unit stabilizes its output to its highly stable and accurate reference clock source, which is not the same clock source as the source unit's clock source. If the source and destination clocks are of sufficient accuracy, the two units will generate and consume the digital data at rates that are nearly identical. This can be achieved if the clock sources are as stable and accurate as the technical attributes of an atomic clock.

A preferred embodiment of the present invention eliminates the necessity for the back channel or clock resynchronization (in the single destination or single source cases), and avoids the necessity for varying the destination clock (which produces particular problems with audio in the unidirectional case) by incorporating an atomic clock at both the source and the destination. The benefit of the accuracy of a reference clock with the accuracy of a chip-scale or PC board mounted atomic clock is such that data can be sent in real time and can be used immediately by the destination without risk that the source will send too much data or that the destination will utilize the data faster than it is being sent, i.e., the buffer overflow and under flow conditions will be eliminated.

Atomic clocks are, by their technological advantage, inherently guaranteed to be synchronized. Consequently, there is no necessity for any circuitry incorporating an adjustable data rate or adjustable clock, and no requirement for a back channel communication for clock resynchronization. An atomic clock is a clock device that uses an electronic transition frequency in the microwave, optical, or ultraviolet region of the electromagnetic spectrum of atoms as a frequency standard for its timekeeping element. Atomic clocks are the most accurate time and frequency standards known, and are used as primary standards for international time distribution services, to control the wave frequency of television broadcasts, and in global navigation satellite systems such as GPS. Since 1967, the International System of Units (SI) has defined the second as the duration of 9,192,631,770 cycles of radiation corresponding to the transition between two energy levels of the cesium-133 atom. These clocks measure frequency with an error of 2 to 3 parts in $10^{14}$, which would correspond to a time measurement accuracy of 2 nanoseconds per day, or one second in 1.4 million years. Although chip-scale, PC board mounted atomic clocks are less accurate than the atomic clocks for international time distribution services, their accuracy still far exceeds the current quartz clocks found in most computerized hardware today. Some chip-scale atomic clocks are based on technology that includes a solid-state laser illuminating a small container holding normal non-radioactive cesium vapor. A microwave generator splits the laser beam into two closely related frequencies, which cause the cesium atoms to "beat" at their difference. It is not uncommon for chip-scale atomic clocks to have less than a $3.0^{-10}$ sec/month aging rate with $\pm 5.0^{-11}$ sec accuracy. Although a different clock technology may be envisioned for use in the present invention, the accuracy and stability would need to be comparable to, and on the order of, a chip-scale, PC board mountable atomic clock.

Figure 1:
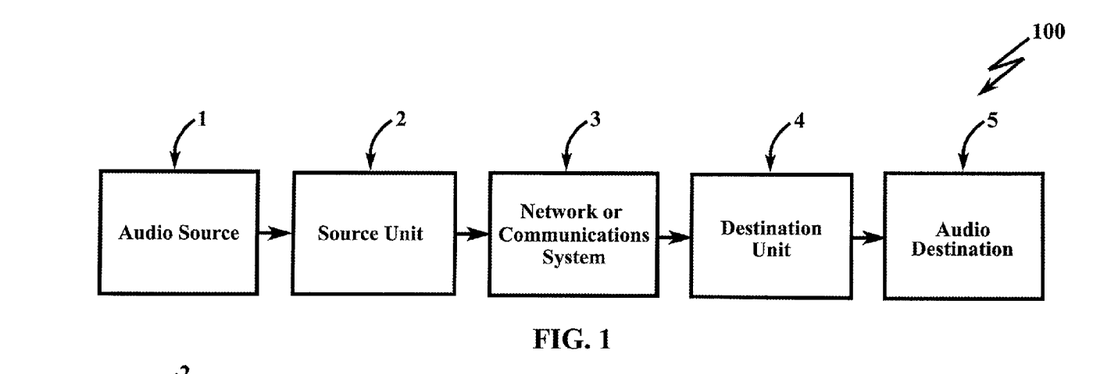
FIG. 1 depicts a linear representation of the digital audio routing system of the present invention.

FIG. 1 depicts a linear representation of the digital audio routing system 100 of the present invention. The apparatus comprises primary elements for seamless audio operation, including one or more audio sources 1, one or more source units 2, a network or communications system 3, one or more destination units 4, and attached audio destinations 5.

Audio source 1 could be any source of digital or analog audio information, such as a microphone, a personal computer, a CD player, a tape recorder, a satellite receiver, a mixer, or another audio router system. Audio destination 5 could be any device that could utilize the audio provided by the source, such as a speaker, an amplifier, a mixer, an audio recording device, a personal computer, or another audio router system.

Audio source 1 preferably accepts one or more audio sources and, if required, converts the audio into digital format, which can be sent over network or communications system 3. Similarly, destination unit 4 preferably receives the digital audio information and, if required, converts the digital formatted audio data into a format for use by audio destination 5. Audio source 1 and source unit 2 may be combined in the same hardware unit, as would be the case for a personal computer sending data over an Ethernet network. Conversely, audio source 1 and source unit 2 may be separate units.

Similarly, destination unit 4 and audio destination 5 may be combined in a single unit, as might be the case for a digital speaker connected to an Ethernet network, or they may be separate units. Network or communications system 3 accepts the formatted digital data from source unit 2 and transfers the data over a predefined medium to destination unit 4. Network or communications system 3 may include an Ethernet network, the Internet, or transmission via wireless transmitters and receivers. Propagation delays and other errors may be introduced during transmission, but the present invention mitigates these errors by the introduction of localized high accurate and stable clocks, such as chip-scale atomic clocks.

Figure 2:
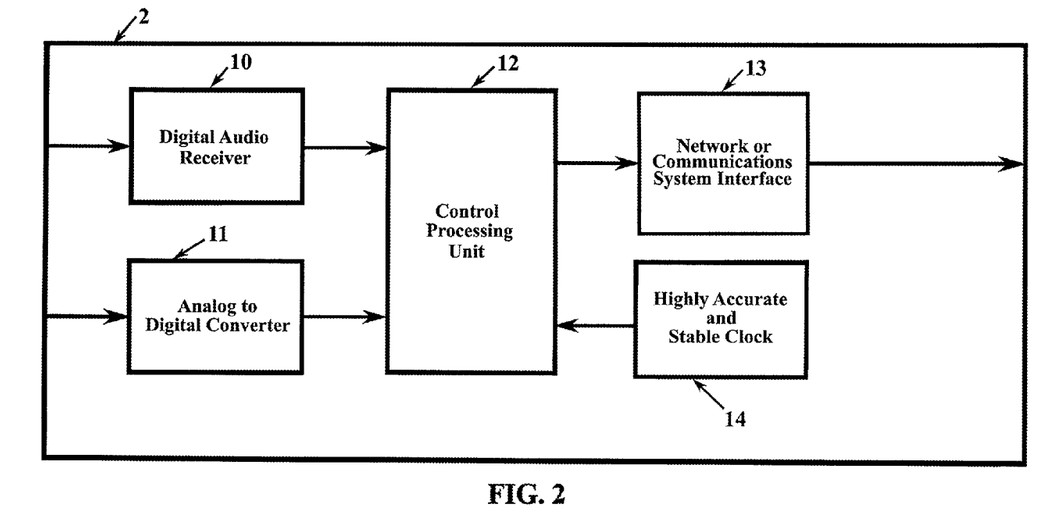
FIG. 2 depicts a structural block diagram of the source unit of the present invention.

FIG. 2 depicts a structural block diagram of source unit 2. Preferably, source unit 2 comprises either one or more digital audio receivers 10, one or more analog to digital converters 11, or some combination thereof. Digital audio receiver 10 receives digital audio from audio source 1 and converts it to a format required by control processing unit 12. Audio source 1 is capable of providing the digital data in any of a number of digital audio formats, such as I2S, AES/EBU, or a direct data/address bus. The output of digital audio receiver 10 is connected to control processing unit 12. Analog-to-digital converter 11 converts an analog input signal, such as a signal from a microphone or the analog output of a CD player. The output of the analog-to-digital converter is connected to control processing unit 12.

Control processing unit 12 accepts digital audio data from any combination of digital audio receivers 10 and analog-to-digital converters 11. Control processing unit 12 synchronizes this data to a highly accurate and stable clock 14, which from the current state of the art would require the technological advantages of a chip-scale atomic clock, or highly accurate and precise clock of a similar nature. For an analog-to-digital converter 12 input, this synchronization can be performed by clocking analog-to-digital converter 12 with a clock derived from clock 14. For digital audio receiver 10, the data may be arriving asynchronously to clock 14, or it may be clocked in synchronously. An example of a synchronously clocked in source would be data received from a hard disc subsystem on a PC, which can be easily synchronized to clock 14 by use of a FIFO (first in, first out) protocol, which is kept full by reading ahead of the output data. Once the digital audio data is synchronized to clock 14, it can then be formatted for transmission through network or communications system 3. The data is sent from control processing unit 12 to network or communications system interface 13, which provides any necessary translation of the data to enter network or communications system 3. Interface 13 may feasibly be an Ethernet adapter or chipset, a wireless transmitter, or any other communications system capable of transferring digital audio data.

Accurate, stable clock 14 is important to the implementation of the present invention. It allows the system to operate without passing digital audio clock signals between the source and destination. Clock 14 must be sufficiently accurate to avoid the problem of too much accumulation of data or absence of data at the destination. If the clock at the destination has a run rate slightly faster than that of the clock at the source, the destination will "clock out" the data at a faster rate than it is receiving it from the source, and run out of data. Similarly, if the clock at the source has a run rate slightly faster than that of the destination clock, the destination will not be "clocking" the data out as fast as it is receiving it, and will fill up its internal buffer, losing data. Both of these situations will result in degradation of the audio signal and prohibit continuous real-time playing of the audio information.

In contrast to the implementation of localized, highly accurate reference clocks taught by the present invention, standard quartz clock oscillators have a typical accuracy of tens or hundredths parts per million (ppm). With an audio sample frequency of approximately 48 kHz, this could result in accumulation or loss of 4 or 5 samples each second. Even with fairly large buffers, this will result in loss of data in a short period of time (minutes or hours). Furthermore, a phase lock mechanism may be required, which could cause audio quality degradation.

By using a highly accurate clock 14, which preferably may be based on atomic electron transition resonance, it is possible to achieve in a chip-scale package, a timing accuracy that far exceeds the accuracy of standard quartz clocks. In this manner, any accumulation of loss of data in this type of system is easily accommodated with a small buffer on the receiving end. Chip-scale atomic clocks are stable enough that they neither gain nor lose more than a few nanoseconds over the course of one day.

Figure 3:
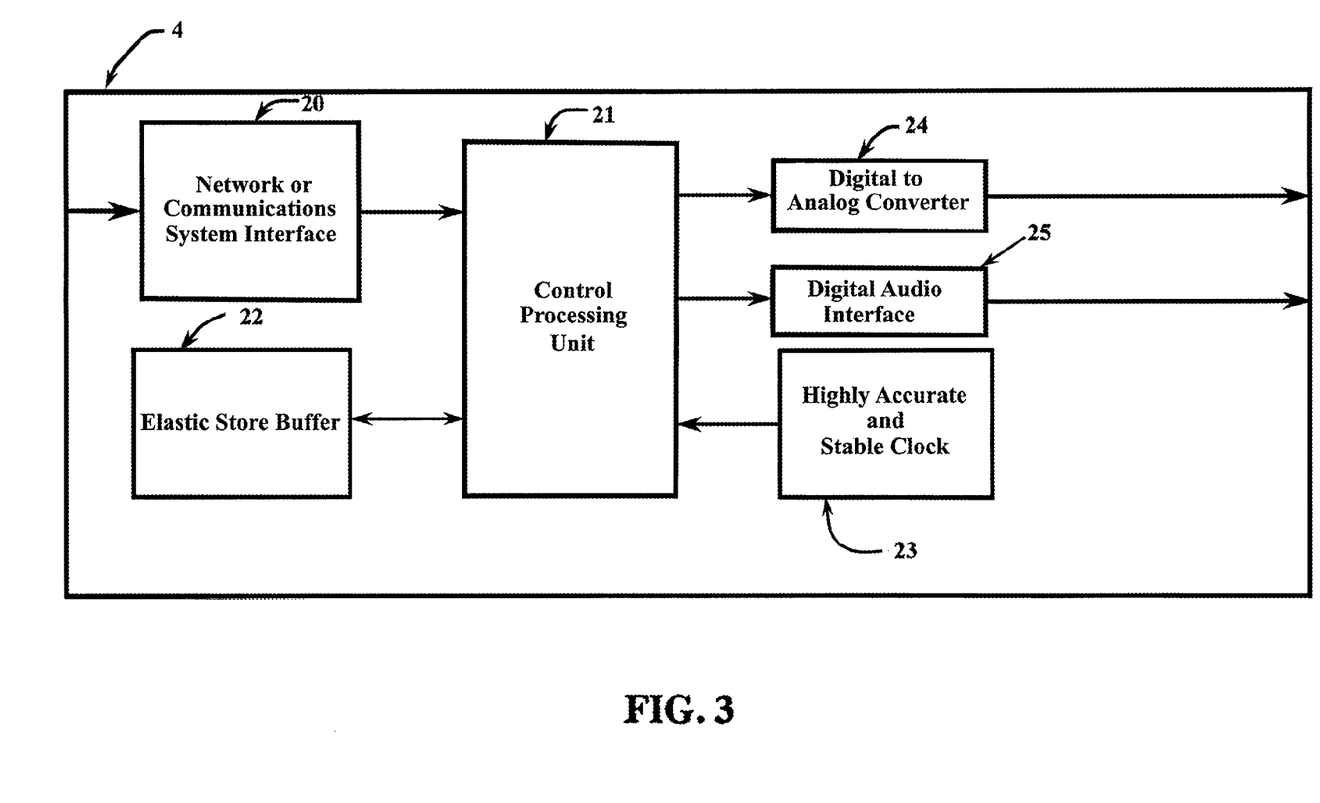
FIG. 3 depicts a structural block diagram of the destination unit of the present invention.

FIG. 3 depicts destination unit 4 including a network or communications interface 20, a control processing unit 21, an elastic store buffer 22, an accurate, stable clock 23 that matches the accuracy and stability of source clock 14, one or more digital to analog converters 24, and one or more digital audio interfaces 25.

Network or communications interface 20 receives data from the network or communications system 3 and supplies any required acknowledgement back to the source system. The received data is error checked and passed to control processing unit 21 for further processing.

Control processing unit 21 buffers the incoming data in elastic store buffer 22. Elastic store buffer 22 is primarily required to allow for extremely small deviations in clock speed between source unit 2 and destination unit 4. Since this deviation is predictably minute, elastic store buffer 22 can be quite small. For example, using localized, chip-scale atomic clocks as part of the system architecture, an elastic store size of only approximately 512 bytes would allow for tens or hundreds of days of running without error.

The data being received from network or communications system 3 may also need to be buffered to allow for dropped and retransmitted data. In this case, additional buffer space may be advantageous, but is not required for implementation of the present invention. The additional buffer space may be addressed either in network or communications interface 20, control processing unit 21, or elastic store buffer 22. In a preferred embodiment, network or communications system interface 20 would buffer data internally, since this processing block is responsible for whatever retry mechanism is required to recover the system from a dropped data block.

Control processing unit 21 uses clock 23 to set the timing of the output data samples sent to digital-to-analog converters 24 or digital audio interfaces 23. Control processing unit 21 is responsible for managing the data within destination unit 4 and performing the data format conversion required to generate the audio samples for the CPUs output.

In a preferred embodiment, clock 23 is a chip-scale atomic clock locked to energy transition levels in atoms, such as cesium; however, a clock not based on energy transition levels in atoms that can rival or achieve the accuracy of chip-scale atomic clocks would also be sufficient. The difference between the two highly stable, accurate clocks 14, 23 in the source units 2 and destination units 4, must be sufficiently small to be accommodated by a very small elastic store buffer 22 for a reasonable playback period.

Digital-to-analog converter 24 is used to convert the digital audio data into analog form for output to an appropriate audio destination 5, such as an amplifier, speaker, or audio mixer.

Digital audio interface 25 performs any translation required to transfer the digital audio data from control processing unit 21 to a digital audio destination 5. This interface could be any appropriate digital interface, such as an AES/EBU digital interface, an address/data bus interface to another processor or IC, or an I2S interface.

The implementation of local, highly accurate clocks eliminates the current problem in the prior art associated with adding significant buffering. In the elastic store buffer 22 of the present invention, there is little storage associated with what would commonly be associated with buffers for this implementation. That is, only a few samples worth of storage are necessitated, but this small amount is enough to achieve years of operation due to the synchronous workings of the localized, highly accurate and precise reference clocks. One may identify this type of system as "micro-buffering," insomuch as elastic store buffer 22 of the present invention does not perform quantity data storing as is commonly expected and required in the prior art.

Thus, by implementing localized clocks on the order of chip-scale atomic clocks in the system architecture, the buffer overflow and underflow problems of the prior art are eliminated. Moreover, the back channel communication is also eliminated. There is no need for additional circuitry for synchronizing the clocks' separate communication, and communication from destination to source is not a requisite; the destination can start receiving audio data and start playing audio data immediately. Thus, the audio signal can be played simultaneously upon reception by the destination without requiring a buffer of the type used in the prior art. Conversely, this architecture can work from destination to source as effectively as it works from source to destination. That is, the signal transmission can be turned around so that a single destination communicates to multiple sources.

Figure 4A:
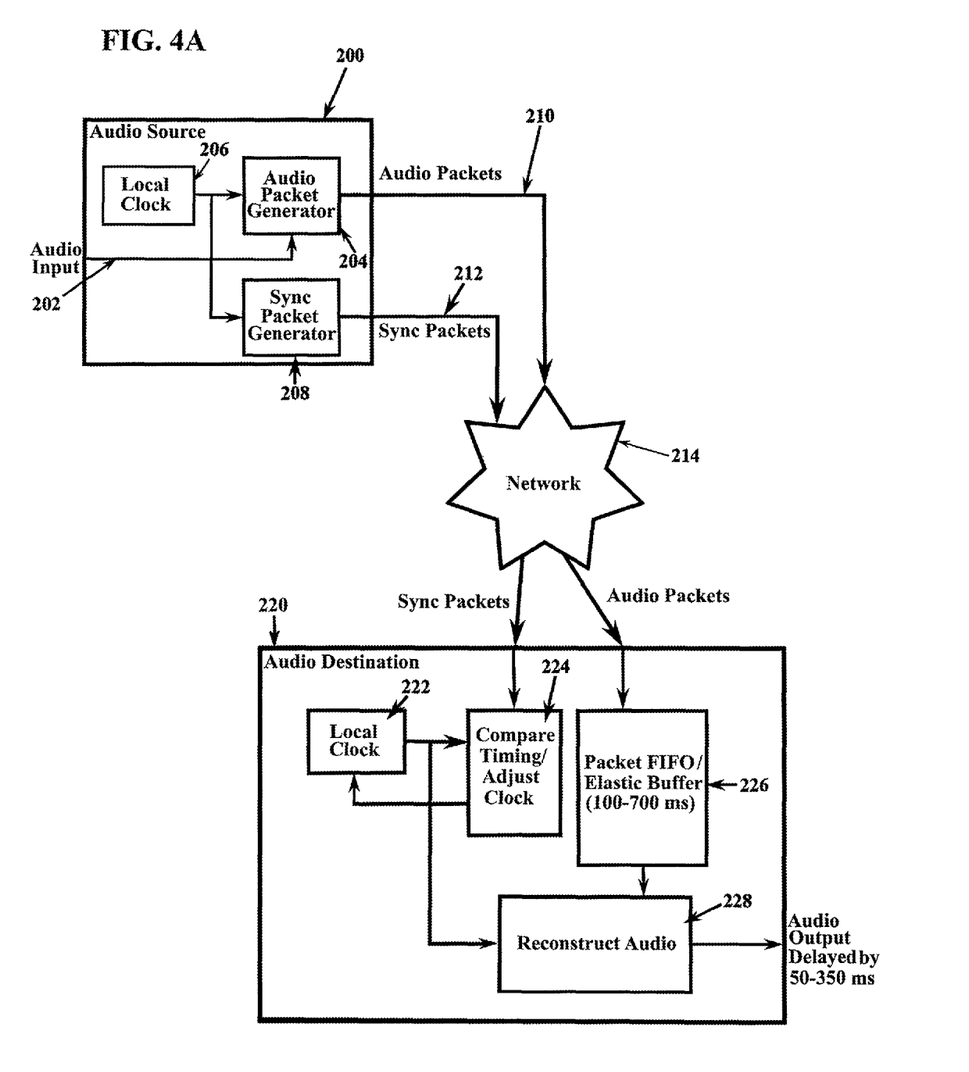
FIG. 4A depicts system architecture using standard local clocks.

A comparison of system architecture without the utilization of localized, highly accurate clocks may be made to system architecture using localized chip-scale atomic clocks. The architectural differences are apparent, and the simplicity of design of the present invention can be easily appreciated. FIG. 4A depicts system architecture using standard local clocks. Audio source 200 receives audio input 202 and generates an audio packet using audio packet generator 204, which is synchronized to local clock 206. Local clock 206 also synchronizes (sends time information to) sync packet generator 208. Audio packets 210 and sync packets 212 are transmitted to a network 214, which transmits the signals to audio destination 220. Audio destination 220 receives sync packets 212 into circuitry 224 that compares the timing, and if necessary adjusts local clock 222. Audio packets 210 are received in a FIFO buffer 226 (typically 100-700 ms in depth). FIFO buffer 226 transmits the audio data to a reconstruction circuit 228, which reconstructs the audio signal using adjusted clock data from local clock 222.

Figure 4B:
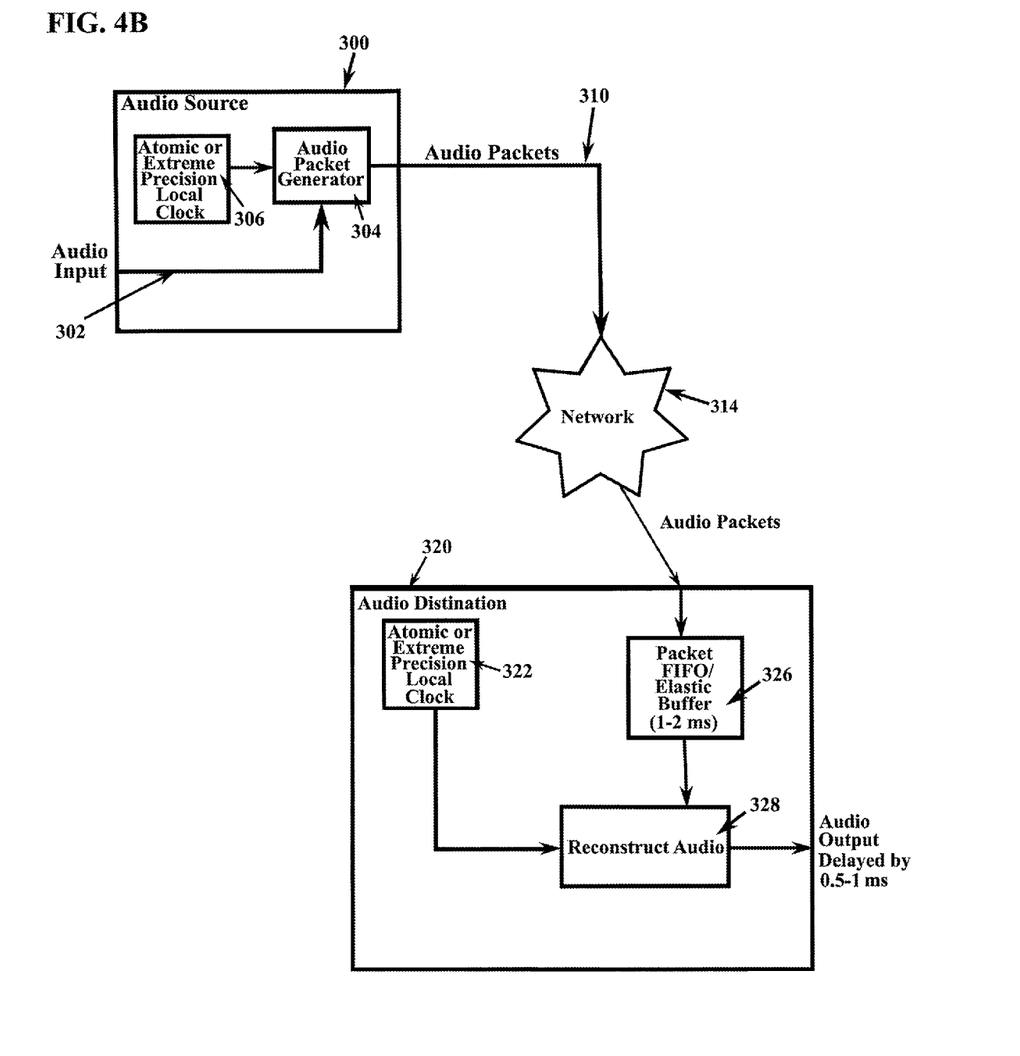
FIG. 4B depicts system architecture using local, highly accurate clocks, such as atomic clocks.

FIG. 4B depicts system architecture using local, highly accurate clocks. The accuracy of these clocks is on the order of chip-scale atomic clocks, and for simplicity, will be referred to herein as atomic clocks, although other clocks of comparable accuracy may be used. Audio source 300 receives audio input 302 and generates an audio packet using audio packet generator 304, which is synchronized to local atomic clock 306. There is no need for a sync packet generator to synchronize time information, and this circuitry is eliminated in this architecture. Audio packets 310 are transmitted to a network 314, which transmits the audio packets to audio destination 320. Sync packets are not generated by audio source 300, and therefore not transmitted to network 314 or audio destination 320. Audio destination 320 receives audio packets 310 in a packet elastic buffer 326 (typically no more than 2 ms in depth). Packet elastic buffer 326 transmits the audio data to a reconstruction circuit 328, which reconstructs the audio signal using localized clock data from local atomic clock 322. In the preferred embodiment of the present invention there is no need for audio destination(s) to compare timing and adjust clocking based on sync packet data.

In this manner, through the utilization of localized, highly accurate and precise clocks that exceeds quartz clock technology, the present invention allows for simultaneous, real-time audio playing at a plurality of destinations based on data streamed from a single source, or conversely, simultaneous playing of a plurality of individual source contributors at a single destination.

The precise hardware structure that represents the system or apparatus for routing digital data synchronized to local reference clocks is governed by the method steps for implementing the routing. The method for routing digital audio data includes the steps of: receiving a digital or analog input audio signal at a source location; generating a digitally encoded data stream from the digital or analog input audio signal; synchronizing the digitally encoded data stream to a highly accurate reference clock at the source location; transmitting the synchronized digitally encoded data stream to a communications network; receiving the digitally encoded data stream at a destination location; decoding or reconstructing the digitally encoded data stream in synchronization to a reference clock at the destination location; and transmitting the decoded or reconstructed digitally encoded data stream to an audio destination.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A system for routing digital data in real time comprising:
   a source unit having an individual chip-scale atomic reference clock and a data packet generator, said source unit data packet generator receiving digital or analog input and generating a digitally encoded data stream from said digital or analog input synchronized to said individual chip-scale atomic reference clock;
   a network or communications system for receiving and transmitting said digitally encoded data stream from said source unit; and
   at least one destination unit including:
   a local chip-scale atomic reference clock providing a reference frequency for each of said at least one destination unit;
   an elastic store buffer receiving said digitally encoded data stream from said network;
   a receiver for decoding or reconstructing said digitally encoded data stream, said receiver synchronized to said local chip-scale atomic reference clock, wherein said reference frequency requires no adjustment for decoding or reconstructing said digitally encoded data stream; and
   an output to at least one audio destination.

2. The system of claim 1 wherein said digital or analog input includes signals from a microphone, personal computer, a CD player, a tape recorder, a satellite receiver, a mixer, a DVD player, or a separate router system.

3. The system of claim 1 wherein said digitally encoded data stream comprises audio data, video data, or a combination thereof.

4. The system of claim 1 wherein said elastic store buffer comprises a FIFO elastic buffer having approximately two milliseconds of storage depth.

5. The system of claim 1 wherein said at least one audio destination includes a speaker, an amplifier, a mixer, a recorder, a personal computer, a separate router system, or any combination thereof.

6. The system of claim 1 wherein said individual reference clock of said source unit, and said local reference clock for each of said at least one destination unit, each comprise a clock device using electronic transition frequency in microwave, optical, or ultraviolet regions as a frequency standard for a timing element, or a solid-state laser illuminating a container holding normal non-radioactive cesium vapor.

7. The system of claim 1 wherein said network or communications system comprises an Ethernet network, an Internet network, or transmission via wireless transmitters and receivers.

8. The system of claim 1 including a plurality of source units, each having an individual chip-scale atomic reference clock and a data packet generator, each source unit data packet generator receiving digital or analog input and generating a digitally encoded data stream from said digital or analog input synchronized to each source unit individual chip-scale atomic reference clock.

9. A system for routing audio digital data in real time comprising:
   an audio source adapted to accept at least one audio signal, said audio source including:
   an internal chip-scale atomic clock; and
   an audio converter for converting said at least one audio signal into digital format forming digital data packets, said digital data packets synchronized to said atomic clock;

a communications network for receiving said digital data packets from said audio source and transmitting to at least one destination unit;

said at least one destination unit adapted to accept said digital data packets from said communication network, each of said at least one destination unit including:

a local chip-scale atomic clock having a reference frequency;

an elastic store buffer having less than or equal to two milliseconds of storage depth for receiving said digital data packets from said communications network; and a receiver for decoding or reconstructing said digital data packets, said receiver synchronized to said local chip-scale atomic clock wherein said reference frequency requires no adjustment for decoding or reconstructing said digitally encoded data stream; and an audio destination for receiving an output from said at least one destination unit.

10. The system of claim 9 wherein said audio signal includes audio signals from a microphone, personal computer, a CD player, a tape recorder, a satellite receiver, a mixer, a DVD player, or a separate router system.

11. The system of claim 9 wherein said audio destination includes a speaker, an amplifier, a mixer, a recorder, a personal computer, a separate router system, or any combination thereof.

12. The system of claim 9 wherein said internal atomic clock of said audio source, and said local atomic clock of said audio destination each comprise a clock device using electronic transition frequency in microwave, optical, or ultraviolet regions as a frequency standard for a timing element.

13. A method for routing digital audio data comprising:
receiving a digital or analog input audio signal at a source location;

generating a digitally encoded data stream from said digital or analog input audio signal;

synchronizing said digitally encoded data stream to a chip-scale atomic clock at said source location;

transmitting said synchronized digitally encoded data stream to a communications network;

receiving said digitally encoded data stream at a destination location;

decoding or reconstructing said digitally encoded data stream in synchronization to a chip-scale atomic clock at said destination location, said chip-scale atomic clock providing a predetermined reference frequency that requires no adjustment for decoding or reconstructing said digitally encoded data stream; and transmitting said decoded or reconstructed digitally encoded data stream to an audio destination.

14. The method of claim 13 including storing a portion of said digitally encoded data stream at said destination location in an elastic store buffer having less than or equal to two milliseconds of storage depth.

15. The method of claim 13 wherein said step of receiving a digital or analog input audio signal includes receiving signals from a microphone, personal computer, a CD player, a tape recorder, a satellite receiver, a mixer, a DVD player, or a separate router system.

16. The method of claim 13 wherein said step of synchronizing said digitally encoded data stream to a chip-scale atomic clock includes synchronizing to a clock device using electronic transition frequency in microwave, optical, or ultraviolet regions as a frequency standard for a timing element.

* * * * *